United States Patent
Tung et al.

(10) Patent No.: US 10,089,486 B2
(45) Date of Patent: Oct. 2, 2018

(54) NON-BLOCKING REGISTRATION IN DISTRIBUTED TRANSACTIONS

(71) Applicant: Hewlett Packard Enterprise Development LP, Houston, TX (US)

(72) Inventors: Shang-Sheng Tung, Cupertino, CA (US); Sean L. Broeder, Sunnyvale, CA (US); Ronald M. Cassou, Palo Alto, CA (US); John Stewart de Roo, Wellington (NZ); Gary Stephen Smith, Auburn, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 47 days.

(21) Appl. No.: 15/032,805

(22) PCT Filed: Oct. 31, 2013

(86) PCT No.: PCT/US2013/067854
§ 371 (c)(1),
(2) Date: Apr. 28, 2016

(87) PCT Pub. No.: WO2015/065450
PCT Pub. Date: May 7, 2015

(65) Prior Publication Data
US 2016/0283733 A1    Sep. 29, 2016

(51) Int. Cl.
| G06F 7/04 | (2006.01) |
| G06F 21/62 | (2013.01) |
| G06F 9/46 | (2006.01) |
| H04L 29/06 | (2006.01) |

(52) U.S. Cl.
CPC .......... *G06F 21/6218* (2013.01); *G06F 9/466* (2013.01); *H04L 67/42* (2013.01)

(58) Field of Classification Search
None
See application file for complete search history.

(56) References Cited

U.S. PATENT DOCUMENTS

| 6,463,456 | B1 | 10/2002 | Kan |
| 8,301,593 | B2 | 10/2012 | Hoffmann et al. |
| 2002/0087366 | A1 | 7/2002 | Collier et al. |
| 2003/0120593 | A1* | 6/2003 | Bansal .............. G06F 17/30873 705/39 |
| 2004/0240444 | A1 | 12/2004 | Matthews |
| 2005/0278458 | A1 | 12/2005 | Berger et al. |

(Continued)

OTHER PUBLICATIONS

Extended European Search Report dated Mar. 23, 2017 for EP application No. 13896767.4; pp. 6.

(Continued)

*Primary Examiner* — Brandon S Hoffman
(74) *Attorney, Agent, or Firm* — International IP Law Group, PLLC (57) ABSTRACT

A method for transaction registration is described herein. The method includes sending, for a transaction manager, a registration request for a transaction. The method also performing data accesses on a data server. The registration request is non-blocking to the data accesses. The method further includes performing a two-phase commit process for the data server if the registration request is accepted. Additionally, the method includes handling the rollback if the transaction registration is rejected.

14 Claims, 6 Drawing Sheets

(56) References Cited

U.S. PATENT DOCUMENTS

| | | |
|---|---|---|
| 2007/0168351 A1 | 7/2007 | Fachan |
| 2009/0300212 A1* | 12/2009 | Hawkes ................. G06F 15/16 709/237 |
| 2011/0035356 A1 | 2/2011 | Vukojevic |
| 2011/0041006 A1 | 2/2011 | Fowler |
| 2011/0246822 A1 | 10/2011 | Little |
| 2011/0320420 A1 | 12/2011 | Pardon et al. |
| 2013/0110961 A1 | 5/2013 | Jadhav |

OTHER PUBLICATIONS

International Searching Authority, Appl No. PCT/US2013/067854, filed Oct. 31, 2013, Search Report and Written Opinion, 10 pp, dated Jul. 24, 2014.

Luttenberger, Konstantin et al., "Making Web Services Enterprise-ready," May 9, 2012; 14 pages.

Red Hat, Inc., "JBoss Enterprise Application Platform 4.2", Edition 2.0, 2010; 25 pages.

* cited by examiner

NON-BLOCKING REGISTRATION IN DISTRIBUTED TRANSACTIONS

CROSS-REFERENCE TO RELATED APPLICATION

Pursuant to 35 U.S.C. § 371, this application is a United States National Stage Application of International Patent Application No. PCT/US2013/067854, filed on Oct. 31, 2013, the contents of which are incorporated by reference as if set forth in their entirety herein.

BACKGROUND

Scaling out is a common approach to dealing with big data in a distributed computing environment. Scaling out involves partitioning data across multiple database servers. With data partitioned, each database server can process its partition of data. In this way, the efficiencies of parallelism and load balance can be achieved through running multiple application service processes for a transaction over multiple database servers.

There is growing interest in putting traditional relational database systems and big data platforms together to provide customers a data center solution in a transparent and transactional way. The big data environment is a distributed system where there may be hundreds or thousands of data servers. Coordinating a large number of data servers with complex transactions and a mixed-workload environment is a challenge.

BRIEF DESCRIPTION OF THE DRAWINGS

Certain examples are described in the following detailed description and in reference to the drawings, in which.

DETAILED DESCRIPTION

In a distributed transaction, each database server includes a process that registers with the transaction before processing its partition. Registration involves approving a process to participate in a transaction. Registration enables a two-phase commit protocol, whereby all processes running under the transaction reach the same conclusion, either to commit the changes performed by each process, or roll them all back, i.e., undo the changes. In the first phase, each process votes, i.e., tells the transaction manager whether the processes changes are to be committed or rolled back. In the second phase, the transaction is committed or rolled back, depending on the outcome of the vote.

Typically, registration blocks the process from modifying its data until the registration is approved. However, because a transaction may include thousands of processes working on it, registration delays the actual processing of much of the transaction. Embodiments of the techniques described herein include a non-blocking transaction registration method that allows each process to proceed before registration is complete, saving time for the entire transaction.

Figure 1:
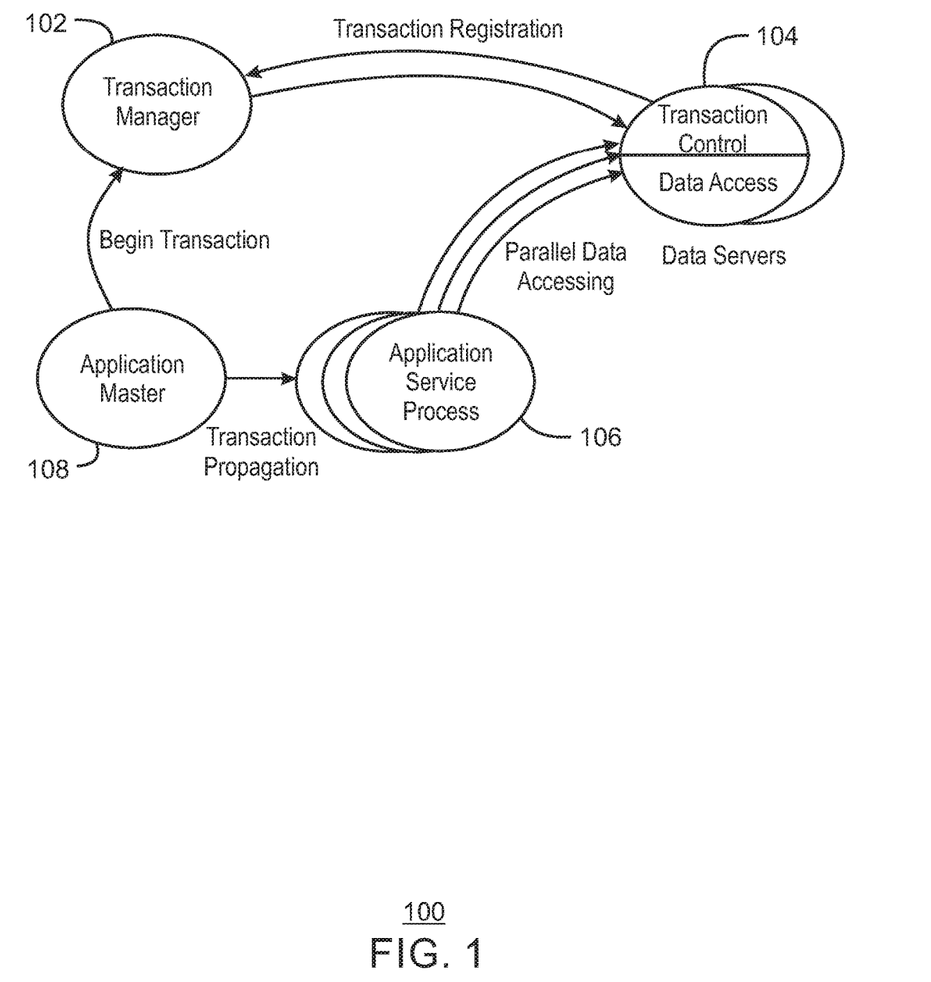
FIG. 1 is a block diagram of a system for non-blocking registration in a distributed transaction, in accordance with examples.

FIG. 1 is a block diagram of a system 100 for non-blocking registration in a distributed transaction, in accordance with examples. The system 100 includes a transaction manager 102, data servers 104, application service processes 106, and application masters 108. The data servers 104 include resource managers with components for transaction control 110 and data access 112. An example of a resource manager is a database management system. The application master 108 is control logic that initiates the distributed transaction. Transactions or queries are usually executed by master/child service processes 106 which access the data through data server processes in parallel. The topology of such process management and data movement is typically planned by a database management system query optimizer.

The application master 108 starts a transaction by acquiring a unique transaction identifier from transaction manager 102. All the following data accesses and updates are based on this identifier. Typically, the application master 108 executes the transaction by starting many child processes, i.e., application service processes 106, and coordinates them to work on the transaction in parallel to improve processing time. The transaction identifier is passed to application service processes 106, which use the identifier to communicate with data servers 104 and to enforce the transaction's atomicity, consistency, isolation, and durability (ACID) property.

When a data server process, e.g., data access 112, sees a new transaction, the transaction control module 110 asks the transaction manager 102 for permission to join the transaction, so the transaction control module 110, as a resource manager, can be enlisted in the transaction and participate into the two phase commit protocol. Additionally, an internal rollback mechanism handles registration failures, which ensures the transactions' ACID property.

If a registration of any of the processes 106 fails, the entire transaction is rolled back. Instead of pushing the transaction from the transaction manager 102 into all the data servers 104, the data servers pull the distributed transaction from transaction manager 102 when the data server 104 first sees the transaction. In this way, only data servers 104 that are participating in the transaction are involved in the two phase commit processing.

Additionally, the data server 104 processes any incoming work for that transaction before the registration outcome is returned. This enables higher parallelism for data servers 104 and may yield a better throughput and response time than approaches using blocking registration. Further, the non-blocking approach may be easily applied to elastic model, i.e., replication model, of data servers 104 because of the flexibility of on-demand registration.

Instead of the transaction manager 102 broadcasting the transaction to all the data servers 104, this kind of registration protocol has the benefit that it is only triggered by the data servers that actually work for that transaction. Data servers 104 that do not have any data access or updates for this transaction will not get involved in this protocol, and will not participate in the two-phase commit. This eliminates unnecessary messaging and reduces the bandwidth used.

Further, embodiments provide a non-blocking way to perform transaction registration. In this method, the data server 104 is not blocked, i.e., the data access 110 does not wait until the completion of transaction registration. Instead, after sending a no-wait registration request, the transaction control 110 presumes successful registration and proceeds to execute the data access 112, but remembers it has the outstanding request for transaction registration. The first request to the data server 104 initiates the registration for the data server 104. Other child service processes accessing data on the same data server 104 for the same transaction are allowed to proceed and execute without further registration. In this way, a high degree of parallelism may be accomplished without delaying the registration process.

Figure 2:
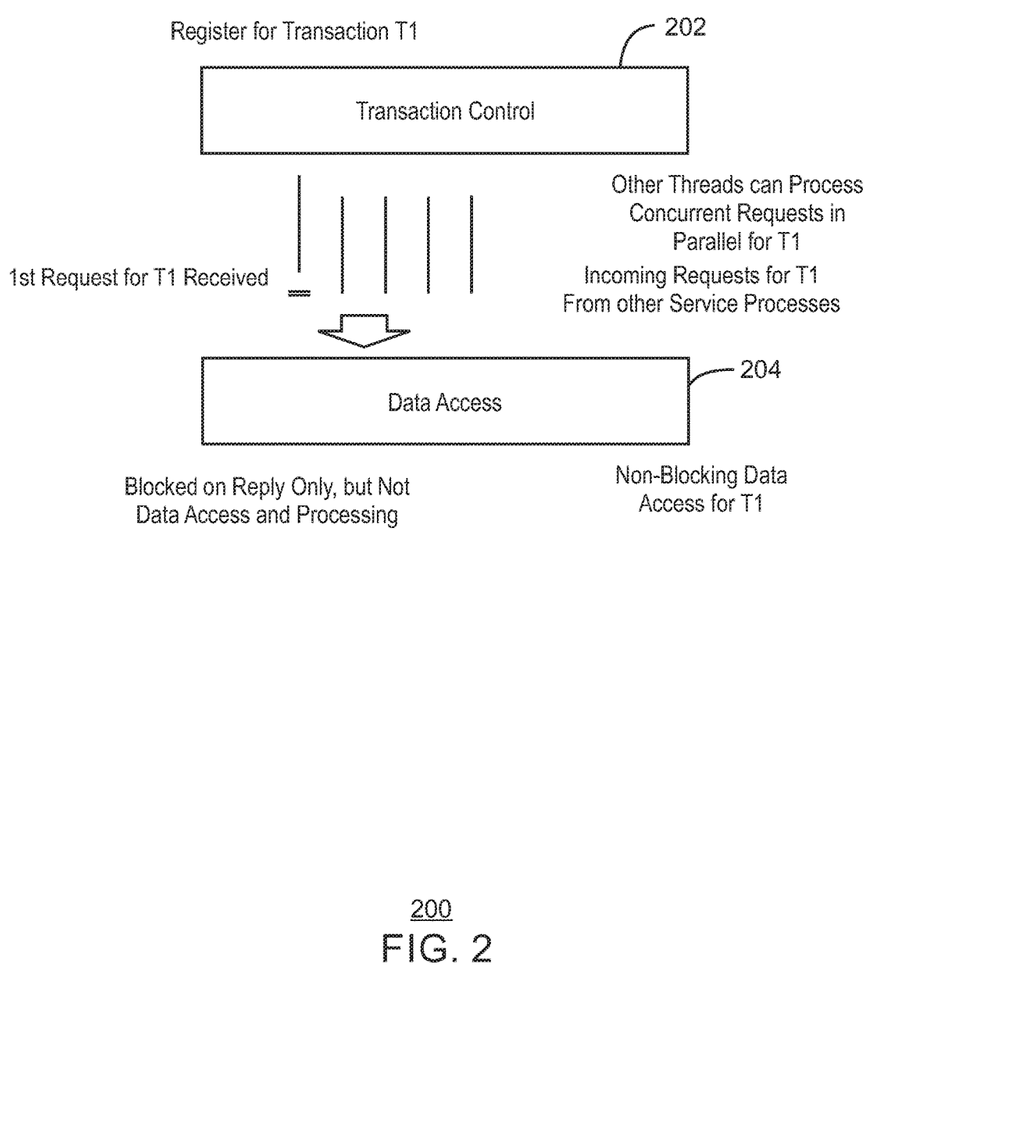
FIG. 2 is a block diagram of an example flow for non-blocking registration in a distributed transaction, in accordance with examples.

FIG. 2 is a block diagram of an example flow for non-blocking registration in a distributed transaction, in accordance with examples. All the requests from the child service processes can be processed and returned, except for the first one, since the first one has an outstanding registration request to the transaction manager 102 to complete. Allowing the first process to return early could leave a window with outstanding input-output, and may cause transaction consistency issues if the transaction is committing. Once the registration decision comes back from the transaction manager 102, the initial request is replied as described in FIG. 2.

When the transaction manager 102 receives the registration, the requesting data server 104 is enlisted as a participant of the transaction, and be involved in the two-phase commit processing if the transaction is in active state. If the transaction has passed the active state, the registration is treated as a late check-in, and is rejected because the outcome of the transaction has been determined. The rejection is replied back to the requesting data server 104.

The transaction processing achieves time savings by assuming most of the transaction registrations succeed. This approach in an experimental database warehouse system could reduce response time by more than ten-fold if transaction registrations are not blocked for online transaction processing, and may not be impacted by a large transaction running at the same time. This optimistic methodology is useful in a mixed-workload environment. However, there are exceptions.

Figure 3:
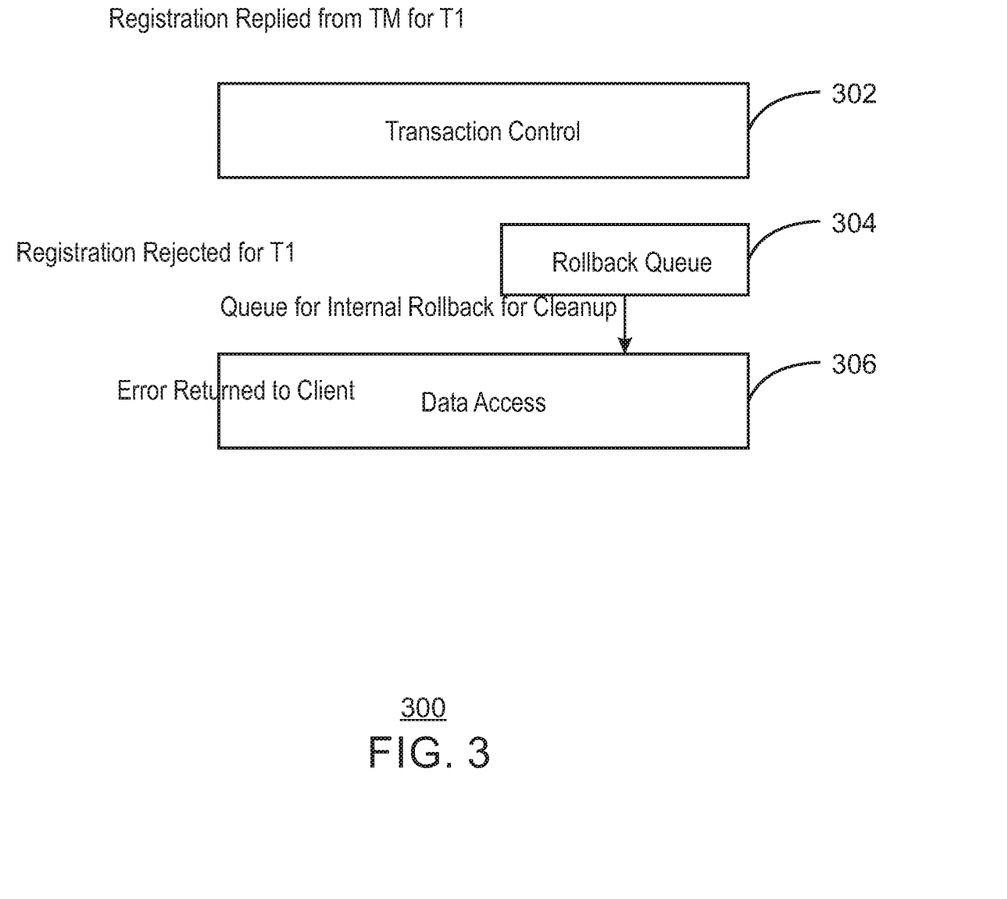
FIG. 3 is a block diagram of a flow for registration rejection and internal rollback in an application service process of a distributed transaction, in accordance with examples.

FIG. 3 is a block diagram of a flow 300 for registration rejection and internal rollback for a data server 104 of a distributed transaction, in accordance with examples. A registration request may be rejected if the distributed transaction has already passed the active state. For example, if the transaction is preparing to terminate, any further registration request are rejected. In such a scenario, the transaction manager 102 returns an exception and does not involve the requesting data server 104 in the commit processing. The data sever has the responsibility to back out any updates. A queuing mechanism to rollback the change due to rejected registration is also proposed to maintain the database consistency. Such approach maintains an ACID-compliant database solution. This system assumes and optimizes for successful transaction registration and treats registration rejection as an exception.

The registration may not always succeed, and could be rejected by the transaction manager 102 for various reasons. For example, a service master process failure could cause the transaction manager 102 to unilaterally abort the transaction. Also, under certain resource restrictions in a cloud environment, a transaction could be aborted. Additionally, when the transaction manager 102 receives the registration, the transaction itself may have already passed active state and does not allow any new enlistment. This situation may happen in a distributed environment where process management could be asynchronous. If such an exception happens, the data server 104 is not enlisted in the transaction from the transaction manager's point of view. For those exception cases, an internal rollback mechanism is used. The data server 104 rolls back updates by itself without an instruction from the transaction manager 102 to ensure the database consistency.

When a registration fails, the transaction control 110 of the data server 104 queues a request for internal rollback, which acts as a pseudo rollback request from the transaction manager 102. This request is then handled in a normal way by the data server 104 for the transaction rollback. This mechanism ensures the correctness of serialization of the concurrent requests and the internal rollback request. The relevant state change and data updates can be propagated to either the backup process (if the data server 104 is a process pair) or the replicated process.

This non-blocking transaction registration protocol together with internal rollback mechanism ensures the transaction's ACID properties, but also lets data server processes run with higher concurrency and throughput, without waiting for the registration. This behavior is useful in the big data environment with thousands of data servers, due to reduced messages, bandwidth consumption, and shorter response time. It is noted that there is no change to data access locking with this protocol. There is no risk of data corruption or violation of isolation as separate transactions could continue to use locks to block access to data that is not committed.

Advantageously, this registration protocol reduces the number of messages between the transaction manager 102 and the data server 104, while reducing the total bandwidth of networking. Further, only data servers 104 participating in the transaction are involved, eliminating the step of broadcasting to all data servers 104. This is useful in the mixed-workload environment where part of the workload involves small transactions touching limited data partitions.

Further, the workload of the transaction manager 102 is reduced, and decreases the transaction completion response time. The protocol also scales out with a growing number of data servers 104, or a large number of transaction managers 102.

Figure 4:
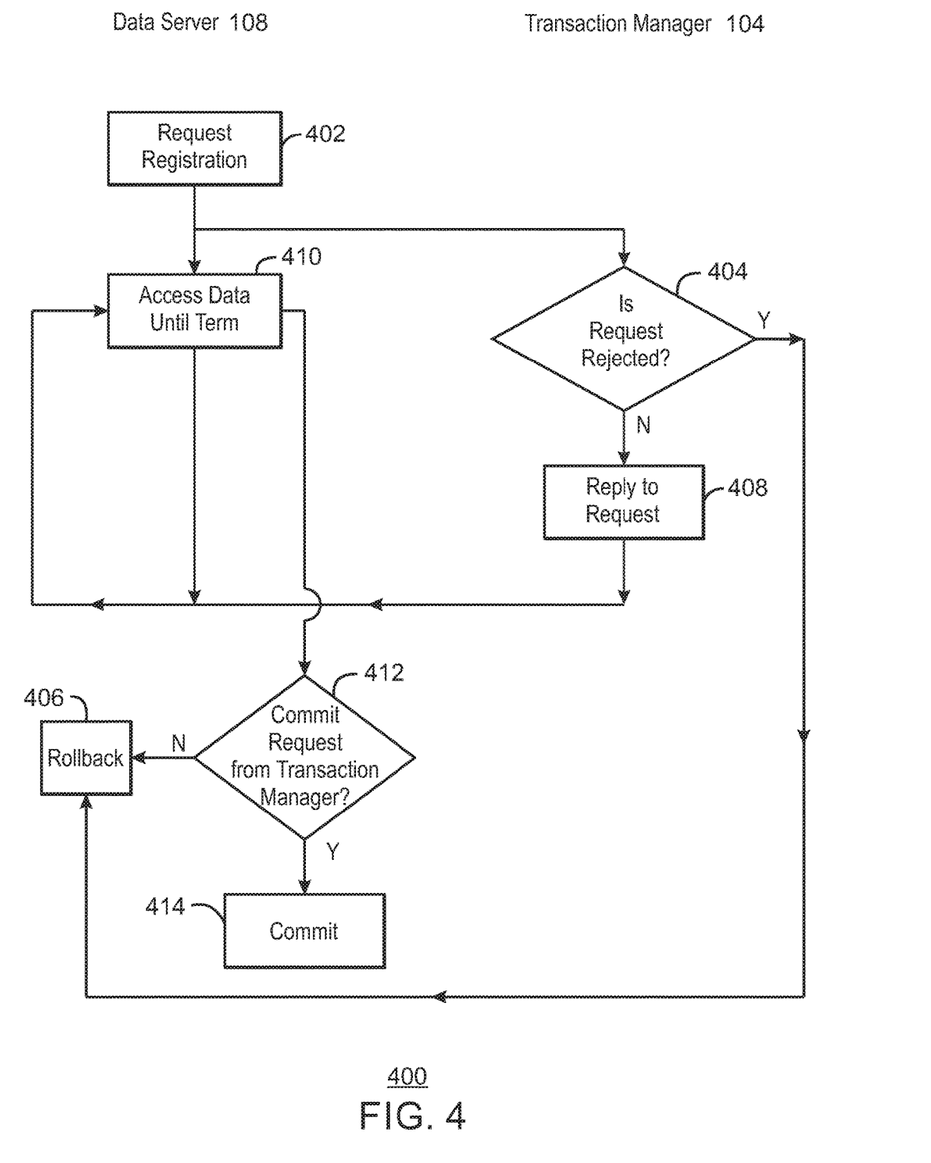
FIG. 4 is a process flow chart of an example method for non-blocking registration in a distributed transaction, in accordance with examples.

FIG. 4 is a process flow chart of an example method 400 for non-blocking registration in a distributed transaction, in accordance with examples. The method 400 is performed concurrently by the data server 104 and transaction manager 102. The method 400 begins at block 402, where the transaction control 110 sends a registration request to the transaction manager 102. At block 404, the transaction manager 102 determines whether the request is rejected. If the request is rejected, at block 406, the data server 104 performs a rollback. If not rejected, at block 408, the transaction manager 102 performs a reply to the application service process 106 initiating the registration.

Concurrently with the transaction manager 102 processing the registration request, at block 410, the data server 104 accesses data. In this way, the data accesses can be executed before the registration reply from the transaction manager 102. This may be so, even for the request triggering the registration. Block 410 continues until termination of the application service process.

At block 412, it is determined whether there is a commit request from the transaction manager 102. If so, at block 414, the requesting data server 104 participates in the two-phase commit process. If not, at block 414, the data server 104 performs a roll back of its data updates.

Figure 5:
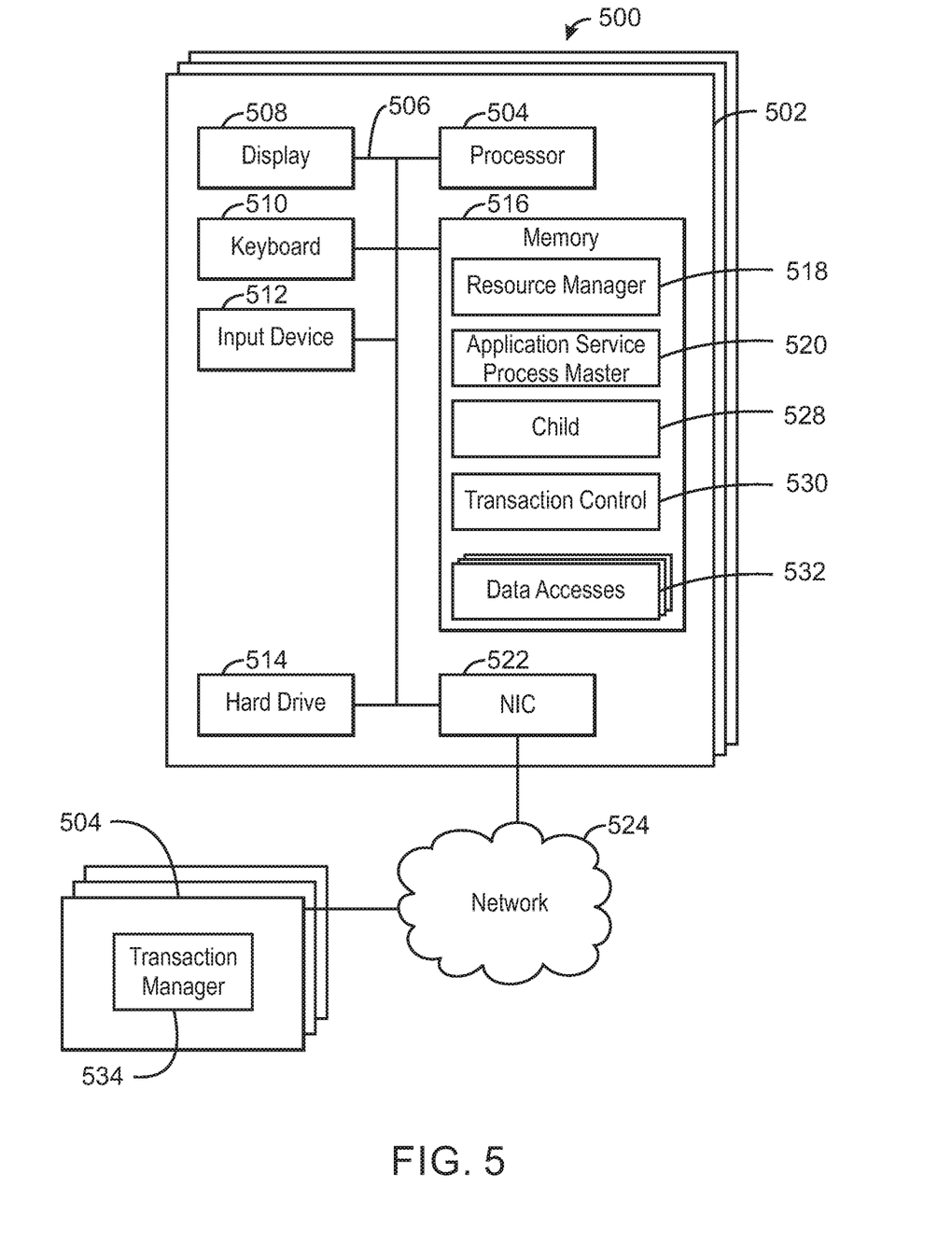
FIG. 5 is a block diagram of an example system that may be used for non-blocking registration in a distributed transaction, in accordance with examples.

FIG. 5 is a block diagram of an example system 500 that may be used for non-blocking registration in distributed transactions, in accordance with embodiments. The system 500 may include a big data system, a mixed-workload environment, or the like. The functional blocks and devices shown in FIG. 5 may include hardware elements including circuitry, software elements including computer code stored on a tangible, non-transitory, machine-readable medium, or a combination of both hardware and software elements. Additionally, the functional blocks and devices of the system 500 are but one example of functional blocks and devices that may be implemented in examples. The system 500 can include any number of computing devices, such as cell phones, personal digital assistants (PDAs), computers, servers, laptop computers, or other computing devices.

The example system 500 can include numerous data servers 502 and a transaction server 504. The data servers 502 have one or more processors 504 connected through a bus 506 to a display 508, a keyboard 510, and an input device 512, such as a mouse, touch screen, and so on. The data server 502 may also include tangible, computer-readable media for the storage of operating software and data, such as a hard drive or memory 516. The hard drive may include an array of hard drives, an optical drive, an array of optical drives, a flash drive, and the like. The memory 516 may be used for the storage of programs, data, and operating software, and may include, for example, the BIOS (not shown). Specifically, the memory 516 includes a resource manager 518, application service process 520, a child service process (child) 528, transaction control 530, and data accesses 532, which are adapted to operate as described in the techniques described herein.

The database servers 502 can be connected through the bus 506 to a network interface card (NIC) 522. The NIC 522 can connect the database servers 502 to a network 524. The network 524 may be a local area network (LAN), a wide area network (WAN), or another network configuration. The network 524 may include routers, switches, modems, or any other kind of interface devices used for interconnection. Further, the network 524 may include the Internet or a corporate network. The data servers 502 may communicate over the network 524 with the transaction server 504. The transaction server 504 may be similarly structured as the data servers 502, with exception to the elements stored in the memory 516. In an exemplary embodiment, the transaction server 504 includes a transaction manager 534, operating in accordance with the techniques described herein.

Figure 6:
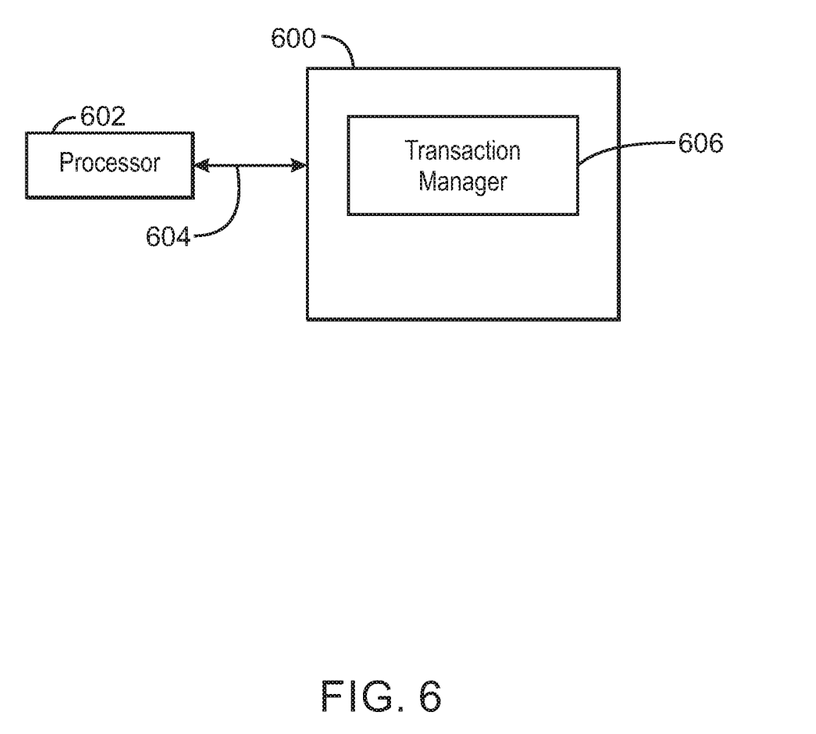
FIG. 6 is a block diagram showing an example tangible, non-transitory, machine-readable medium that stores code adapted for non-blocking registration in distributed transactions, in accordance with examples.

FIG. 6 is a block diagram showing an example tangible, non-transitory, machine-readable medium 600 that stores computer-implemented instructions adapted for non-blocking registration in distributed transactions. The machine-readable medium is generally referred to by the reference number 600. The machine-readable medium 600 may correspond to any typical storage device that stores computer-implemented instructions, such as programming code or the like. Moreover, the machine-readable medium 600 may be included in the storage 516 shown in FIG. 5. When read and executed by a processor 602, the instructions stored on the machine-readable medium 600 are adapted to cause the processor 602 to process the instructions of a transaction manager 606.

The transaction manager 606 is adapted to perform in accordance with the techniques described herein. A transaction manager is sent a registration request for a transaction. Concurrently with accepting or rejecting the request, data accesses are performed on the data server sending the registration request. The registration request is non-blocking to these data accesses. A first registration request associated with a data server is blocking to the termination of the transaction.

The enlisted child service processes performing the data accesses on the data server participate in a two-phase commit process for the data server if the registration request is accepted. The data servers are rolled back in the case of an aborted transaction or a rejected request. Updates performed during the data accesses are committed in the case of a normal transaction termination.

What is claimed is:

1. A method for registering a transaction, the method comprising:
sending, for a transaction manager, a registration request for a transaction;
performing data accesses on a data server, the registration request being non-blocking to data accesses associated with the registration request;
performing a two-phase commit process for the data server if the registration request is accepted;
sending, for the data server, a reply to the registration request;
sending, by a master application service, the registration request for a child application service performing data accesses on the data server;
determining the registration request is late;
and rejecting the registration request.

2. The method of claim 1, comprising performing a rollback by the data server in response to the reply.

3. A method for registering a transaction, the method comprising:
sending, for a transaction manager, a registration request for a transaction;
performing data accesses on a data server, the registration request being non-blocking to data accesses associated with the registration request;
performing a two-phase commit process for the data server if the registration request is accepted;
sending, for the data server, a reply to the registration request;
sending, by a master application service, the registration request for a child application service performing data accesses on the data server;
determining the registration request is a first request for the data server; and
determining the registration request is not late.

4. The method of claim 1, wherein a big data environment comprises the data server.

5. The method of claim 1, wherein the registration request is non-blocking to data accesses associated with the registration request in that the data accesses on the data server are carried out prior to returning of an outcome for the registration request.

6. The method of claim 3, comprising:
receiving a registration request for the transaction from an additional child application service, the registration request being non-blocking to data accesses by the additional child service application;
determining that the data server has sent a previous registration request; and
enlisting the additional child application service in the transaction.

7. A system, comprising:
a plurality of data servers, comprising:
a plurality of memory devices; and a plurality of data server processors adapted to execute instructions stored in the memory devices to:
send, for a transaction server, a registration request for a transaction; and
perform data accesses on one of the data servers, the registration request being non-blocking to the data accesses; and
a transaction server, comprising:
a memory device; and
a transaction processor adapted to execute instructions stored in the memory device to:
determine whether the registration request is late; and
enlist the data server in the transaction if the registration request is not late.

8. The system of claim 7, the transaction processor adapted to execute instructions stored in the memory device to:
determine the registration request is rejected; and
send a reply rejecting the registration request.

9. The system of claim 8, the data server processors adapted to execute instructions stored in the memory devices to perform a rollback by the data server in response to the reply.

10. The system of claim 7, the transaction processor adapted to execute instructions stored in the memory device to:
determine the request is accepted;
send a reply accepting to the registration request; and
include the data server in a two-phase commit process for the transaction.

11. The system of claim 10, the data server processors adapted to execute instructions stored in the memory devices to send, by a master application service associated with a child application service, the registration request for the child application service, the child application service performing data accesses on the one data server.

12. The system of claim 7, comprising a mixed-workload environment.

13. A non-transitory computer-readable medium including programming for execution by a processor, the programming, when executed by the processor, implementing a method, comprising:
sending, for a transaction manager, a registration request for a transaction;
performing data accesses on a data server, the registration request being non-blocking to data accesses associated with the registration request;
performing a two-phase commit process for the data server if the registration request is accepted;
sending, for the data server, a reply to the registration request;
a master application service sending the registration request for a child application service performing data accesses on the data server;
determining the registration request is a first request for the data server; and
determining the registration request is not late.

14. The non-transitory computer-readable medium of claim 13, further including programming for execution by the processor, the programming, when executed by the processor further implementing the method comprising:
enlisting the data server in the transaction in response to the determination that the registration request is not late.

* * * * *